No. 728,968. Patented May 26, 1903.

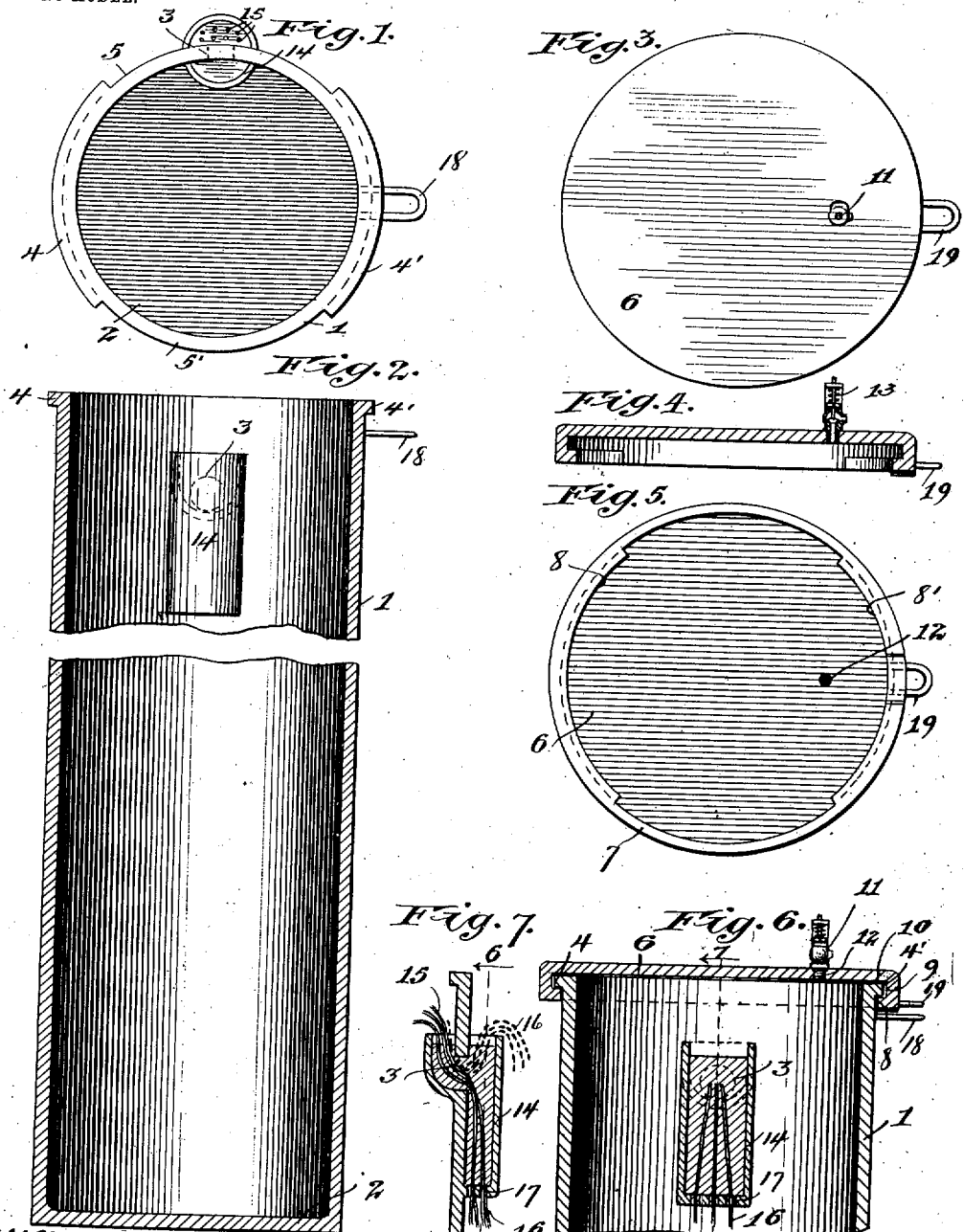

UNITED STATES PATENT OFFICE.

FREDERICK E. PARADIS, OF CHICAGO, ILLINOIS.

BATTERY-CHUTE.

SPECIFICATION forming part of Letters Patent No. 728,968, dated May 26, 1903.

Application filed July 23, 1902. Serial No. 116,653. (No model.)

*To all whom it may concern:*

Be it known that I, FREDERICK E. PARADIS, of Chicago, Cook county, and State of Illinois, have invented certain new and useful Improvements in Battery-Chutes, of which the following is a specification.

This invention relates to improvements in storage-receptacles, and refers more specifically to an improved receptacle adapted for the storage of electric batteries, especially when used underground, and commonly known in the trade as "battery-chutes."

The objects of the invention are to provide a simple economical construction which is adapted to be readily sealed hermetically, so as to effectually protect the battery from weather and against deterioration by evaporation, oxidation, &c.; to provide a construction which may be installed underground without danger of access of moisture or dirt to the battery and to which access may be readily had without moving the receptacle from its place of installation; to provide improved means for effecting the sealing of the opening through which the conductors connected with the battery elements extend, whereby the opening and closing of the receptacle does not affect or destroy the sealing of said conductor-opening; to provide a construction which while sealed against access of air and moisture nevertheless provides for the relief of pressure in case batteries be employed which generate an internal pressure in the receptacle, and in general to provide a simple, improved, and efficient construction of the character referred to.

To the above ends the invention consists in the matters hereinafter described, and more particularly pointed out in the appended claims, and the invention will be more readily understood from the following description by reference to the accompanying drawings, forming a part thereof, and in which—

Figure 1 is a top plan view of the receptacle with the cover or closure removed. Fig. 2 is a vertical or axial sectional view, a part of the central portion of the figure being broken out to reduce the length thereof. Fig. 3 is a top plan view of the cover. Fig. 4 is a transverse sectional view of the same. Fig. 5 is a bottom plan view of the cover. Fig. 6 is a vertical sectional view of the cover and upper portion of the chute with the cover in position upon the latter, the section being also taken through the sealing-receptacle controlling the conductor-opening on line 6 6 of Fig. 7, and Fig. 7 is a fragmentary sectional view taken on line 7 7 of Fig. 6.

Referring to the drawings, 1 designates as a whole the main body of the receptacle, which consists, preferably, of a cylindric cast-metal vessel having an integral and closed lower end tube and provided near its upper end with an opening through one side, as at 3, through which the conductors connected with the batteries or cells within the batteries are extended. Around the margin of the upper end of the receptacle is formed a flange consisting of two or more outturned portions, as 4 4', said flange being interrupted at diametrically opposite points, so as to provide intervening spaces 5 and 5', devoid of the peripheral flange.

6 designates as a whole the cover, which is desirably a flat plate-like casting, conforming to the cross-sectional shape of the receptacle 1 and provided with a cylindric peripheral flange 7, which telescopes snugly over and upon the upper end of the body of the vessel. At diametrically opposite points the depending flange 7 is provided with inturned horizontal extensions 8 8', which fit closely underneath the flange portions 4 and 4' of the receptacle when the cover is placed thereon and rotated a partial turn, so as to bring the horizontal flange extensions underneath or into register with the outturned flange portions of the receptacle. The circumferential lengths of the inturned flange extensions 8 and 8' are sufficiently less than the width of the interruptions of the flange on the main body to permit said parts to be assembled in the manner described. In order that the cover may be caused to form a hermetical joint with the upper end of the receptacle, the vertical width of the flange portions 4 4' is made slightly less than the annular groove 9 upon the interior of the cover-flange, and a packing washer or gasket 10, preferably of rubber, is interposed between the upper end of the receptacle and the overlying inner face of the cover, which is of such thickness as to be compressed when the cover is in closed position.

Inasmuch as these receptacles are sometimes used with batteries which in operation generate gas, means are provided for relieving such internal pressure when necessary, such means consisting in the present instance of an ordinary relief-valve 11, threaded into a suitable aperture 12, formed through the cover, said relief-valve being controlled by a spring-pressed plunger 13, which normally holds the valve closed, but yields under access of pressure.

Inasmuch as the receptacles are opened and inspected and the batteries replaced much more frequently than it is necessary to remove the batteries bodily, it becomes important to provide means for leading the conductors out through the wall of the receptacle in such manner that they are not disturbed by the opening and closing of the receptacle. It is also a feature of great importance that the chute be kept hermetically closed, both in order to prevent access of air and moisture thereto and, further, to prevent evaporation of the fluids of the batteries, which evaporation rapidly destroys the efficiency of the cells. Accordingly I have provided in the present invention means of attaining these objects which not only maintains the battery-receptacle sealed, but is of such construction that the seal may be broken and renewed with great facility and economy. To this end I provide upon the interior of the main receptacle a small sealing receptacle or cup 14, which is so located that the conductor-aperture 3, hereinbefore referred to, opens into the cup at a point intermediate of the depth of the latter. I also provide a somewhat similar cup or receptacle 15 upon the outside of the main receptacle, into which the opening 3 likewise extends. I then arrange the conductors 16, connected with the batteries to extend out through the inner cup, thence through the opening 3 and out through the outer cup 15, as shown clearly in Fig. 7. In the preferred embodiment shown herein the conductors are extended downwardly through openings 17 in the bottom of the inner cup, and the latter is made of considerable depth; but I may, if preferred, simply carry the conductors from the batteries up over the upper edge of the inner cup or receptacle and then downwardly through the opening 3 and out as before, as indicated in dotted lines. In either case after adjusting the conductors to place I fill both cups with a suitable packing—such, for example, as paraffin, asphalt, or other semisolid—which will form a hermetical seal around the conductors and then likewise seal the opening 3. Inasmuch as the inner and outer receptacles 14 and 15 are in communication with the opening 3 and both receptacles rise to a point above said opening, the packing material may be flowed in or forced in from either the outside or inside of the receptacle at will.

In order to prevent surreptitious access to the receptacle, staples 18 and 19 are cast or secured within the sides of the receptacle and cover, respectively, which staples are so located as to be brought into vertical alinement or register with each other when the cover is in position upon the receptacle. An ordinary padlock may be employed to secure the staples together by passing the hasp of the lock therethrough in the usual manner.

A receptacle constructed in accordance with the present invention is not only extremely cheap to manufacture, but provides perfect protection for the battery against moisture and the weather and against unauthorized tampering. In practice these chutes are usually set into the ground in pits, so that they will be below the freezing-line, and the batteries will therefore not be rendered useless in winter. Owing to the peculiar construction of the cover and the manner in which it interfits with the upper end of the receptacle, the receptacle is effectually sealed; but at the same time the cover may be readily removed by simply removing the padlock and rotating it a quarter-turn and lifting it up. The provision of the opening for the conductors through the wall of the receptacle below the cover and means whereby this opening may be kept sealed obviously enables the main cover to be removed and the batteries inspected as frequently as necessary without in any way disturbing the conductor connections. This particular feature of my improvement—namely, the provision of a passage for conductors through the wall of a receptacle which is arranged to open within a sealing-receptacle—is not to be understood as limited to the present application, but, on the contrary, this improvement may be employed in other connections.

I claim as my invention—

1. A receptacle for batteries comprising a cylindric cast-metal receptacle having a closed integral lower end and a laterally-extending peripheral interrupted flange at its upper end, a cover provided with a peripheral depending flange constructed to telescope and fit upon the upper end of the receptacle and provided with inturned interrupted flange extensions, as 8 and 8', adapted to interlock underneath the flange portions of the receptacle, a lateral conductor-passage in the upper portion of the side wall of the receptacle, a sealing-receptacle within which said conductor-passage opens, and means for locking the cover against rotation upon the body with the flange portions of the cover and body in register, substantially as described.

2. A battery-chute comprising the cylindric vessel 1 provided with the integral closed bottom 2, the peripheral laterally-extending flange portions 4 and 4' upon the upper end of said receptacle, the conductor-passage 3 extending through the side wall of the receptacle, the sealing-receptacles 14 and 15 upon said side wall and with the interiors of which the passage 3 communicates, and the cover 6 provided with the peripheral flange 7, and interrupted inturned flange extensions 8 and 8', substantially as described.

3. In a receptacle, means for providing a sealed passage for electrical conductors through the side wall of said receptacle comprising horizontally-opposite inner and outer receptacles upon said wall adapted to contain a sealing composition and an opening through the wall arranged to form a communication between the interiors of said receptacles and located below the top sealing-level thereof.

4. In a battery-chute, means for providing a sealed passage for electrical conductors through the wall of said chute comprising horizontally-opposite receptacles, and a partition extending between said receptacles, an opening through said partition affording communication between the receptacles at a point below the sealing-level thereof, one of said receptacles arranged to communicate with the interior of the chute, and the other with the exterior, and a filling of sealing material filling said receptacles to a point above the communicating passage therebetween, for the purpose set forth.

FREDERICK E. PARADIS.

Witnesses:
ALBERT H. GRAVES,
FREDERICK C. GOODWIN.